US005580910A

United States Patent [19]
Isaac et al.

[11] Patent Number: 5,580,910
[45] Date of Patent: Dec. 3, 1996

[54] SELF SEALING FILM

[75] Inventors: Robert L. Isaac, Bethesda, Md.; Bernard Cohen, Berkeley Lake; Lee K. Jameson, Roswell, both of Ga.

[73] Assignee: Kimberly-Clark Corporation, Neenah, Wis.

[21] Appl. No.: 46,064

[22] Filed: Apr. 12, 1993

[51] Int. Cl.[6] .............................. C08L 1/08; C08L 29/00
[52] U.S. Cl. .................... 529/17; 524/18; 524/31; 524/32; 524/27; 524/52; 524/167; 524/284; 524/388; 525/54.3; 525/55; 428/913
[58] Field of Search .................. 524/167, 45, 31, 524/32, 52, 27, 47, 17, 18, 388, 284; 525/54.3, 55; 428/226

[56] References Cited

U.S. PATENT DOCUMENTS

| | | | |
|---|---|---|---|
| 3,365,320 | 1/1968 | Minelli | 106/133 |
| 3,526,538 | 9/1970 | Lindemann et al. | 117/140 |
| 3,554,788 | 1/1971 | Fechillas | 117/140 |
| 3,580,253 | 5/1971 | Bernardin | 128/290 |
| 3,890,974 | 6/1975 | Kozak | 128/287 |
| 3,952,347 | 4/1976 | Comerford et al. | 5/335 |
| 4,028,290 | 6/1977 | Reid | 524/768 |
| 4,063,995 | 12/1977 | Grossman | 162/112 |
| 4,186,233 | 1/1980 | Krajewski et al. | 428/213 |
| 4,200,558 | 4/1980 | Holst et al. | 536/58 |
| 4,410,571 | 10/1983 | Korpman | 427/385.5 |
| 4,454,055 | 6/1984 | Richman et al. | 604/368 |
| 4,518,721 | 5/1985 | Dhabhar et al. | 523/120 |
| 4,534,767 | 8/1985 | Habib | 604/336 |
| 4,578,065 | 3/1986 | Habib | 604/336 |
| 4,655,840 | 4/1987 | Wittwer et al. | 106/126 |
| 4,861,539 | 8/1989 | Allen et al. | 264/204 |
| 4,913,517 | 4/1990 | Arroyo et al. | 350/96.23 |
| 5,013,769 | 5/1991 | Murray et al. | 523/111 |
| 5,056,960 | 10/1991 | Marienfeld | 405/270 |
| 5,225,489 | 7/1993 | Prevorsek et al. | 525/151 |
| 5,248,720 | 9/1993 | Deguchi et al. | 524/444 |
| 5,317,037 | 5/1994 | Golden et al. | 523/128 |
| 5,342,686 | 8/1994 | Gversen et al. | 428/378 |

FOREIGN PATENT DOCUMENTS

| | | |
|---|---|---|
| 2005764 | 6/1990 | Canada . |
| 0042259 | 12/1981 | European Pat. Off. . |
| 0164197 | 12/1985 | European Pat. Off. . |
| 0378940A1 | 7/1990 | European Pat. Off. . |
| 489967 | 6/1992 | European Pat. Off. . |
| 499672 | 8/1992 | European Pat. Off. . |
| 0585906A2 | 3/1994 | European Pat. Off. . |
| 63-304082 | 12/1988 | Japan . |
| 3-20364 | 1/1991 | Japan . |
| 3-95211 | 4/1991 | Japan . |
| 5-086344 | 4/1993 | Japan . |
| 6-057059 | 3/1994 | Japan . |
| 1379660 | 1/1975 | United Kingdom . |
| 2048078 | 12/1980 | United Kingdom . |
| 2246373 | 1/1992 | United Kingdom . |

OTHER PUBLICATIONS

"Preparation and use of composites swellable by water", *Chemical Abstracts*, vol. 114, No. 12, abstract No. 114:103864m, Mar. 24, 1991.

"The structure and properties of thixotropic gels", *Chemical Abstracts*, vol. 30, No. 19, Oct. 10, 1936.

"Eastman AQ® Polymers Properties and Applications", Eastman Chemicals Publication No. GN–389B, pp. 1–28, May 1990.

Copy of European Search Report of Mar. 18, 1994.

Die Struktur und die Eigenschaften der thixotropen Gele, Von B. S. Kandelaky, Kolloid Zeitschrift, V. 74 pp. 200–205 (Feb. 1936).

*Kirk–Othmer Encyclopedia of Chemical Technology*, 3rd ed., Vol. 5, pp. 118–163, John Wiley & Sons, N.Y.–Chester–Brisbane & Toronto, (Mar. 1979).

*Kirk–Othmer Encyclopedia of Chemical Technology*, 3rd ed., Vol. 21, pp. 492–505, John Wiley & Sons, N.Y.–Chester–Brisbane & Toronto, (Mar. 1983).

*The Condensed Chemical Dictionary*, 10th ed., Gessner G. Hawley, Van Nostrand Reinhold Co., N.Y., N.Y., p. 838, (est. Jul.–Aug., 1981).

*The Condensed Chemical Dictionary*, 10th ed., Gessner G. Hawley, Van Nostrand Reinhold Co., N.Y., N.Y., p. 14, (est. Jul.–Aug., 1981).

Polymer Yearbook 3, Richard H. Pethrick, Harwood Academic Publishers, Chur–London–Paris–New York, p. 65, (Sep. 1986).

*Absorbent Polymer Technology*, Lisa Brannon–Peppas and Ronald S. Harland (eds.), Elsevier, pp. 3–22, (Sep. 1990).

*Principles of Colloid and Surface Chemistry*, Paul C. Hiemenz, 2nd ed., Marcel Dekker, Inc., pp. 782–783 (Dec. 1985).

Copy of PCT Search Report mailed Aug. 5, 1994 for PCT counterpart to USSN 08/046,064.

BF Goodrich Specialty Polymers & Chemicals Division, *Hystretch© Elastomer Emulsions*, Doc. No. MSD90.534, Nov. 2, 1990.

Hoechst Celanese Corporation, *Material Safety Data Sheet*, MSDS No. 1101750318, Feb. 7, 1992, pp. 1–3.

Primary Examiner—Jeffrey Mullis
Attorney, Agent, or Firm—Joseph P. Harps

[57] ABSTRACT

The present invention is directed toward a water vapor responsive self sealing thin film which is formed from a blend of at least about 75 weight percent of a water dispersible polymer; from about 0.5 to about 5 weight percent of a xerogellant; and from about 7.5 to about 20 weight percent of a plasticizing agent.

16 Claims, 2 Drawing Sheets

SELF SEALING FILM

RELATED APPLICATIONS

Other pending applications by the present inventors include U.S. application Ser. No. 07/997,797, entitled "Hydrodisintegratable Material and Products Formed Thereby" and filed on Dec. 29, 1992 and U.S. application Ser. No. 08/107,490, entitled "Binder Compositions and Web Materials Formed Thereby" and filed on Aug. 17, 1993 and now U.S. Pat. No. 5,466,518.

FIELD OF THE INVENTION

The field of the present invention is that of film materials which, if apertured, have the ability to self seal.

BACKGROUND OF THE INVENTION

For quite some time those in the art have been searching for a film material which, if apertured, has the ability to self seal and close the apertures in the presence of water vapor. Such a film would have considerable usefulness in a wide variety of areas. An exemplary area of application of such a material would be in the formation of tent fabric. If the fabric was slightly apertured, a film which would self seal in response to contact with water or water vapor would be highly desirable.

During experimentation directed to measuring the water vapor transmission rate (WVTR) of various apertured film materials we observed that certain commercially available trash bags, when apertured, self sealed during the WVTR test. We hypothesized that this action was due to the presence of an additive or additives to the film which was not normally present in polyethylene trash bags. Possible components of this sort were starch and iron oxide. We were able to check the possibility of whether starch, by itself, was the self sealing factor by testing commercially available film containing starch as an additive but not iron. As aperture closure did not occur, we concluded that starch, by itself, did not appear to be the component causing the observed result. Plastic film containing only iron oxide as an additive is not known to us to be commercially available. However, it is known that, under certain conditions, $Fe_2O_3$ in the presence of water will form a hydroxide $Fe(OH)_3$ which is a sol. This material by itself or in the presence of starch would flocculate and explain the observed aperture sealing. It should be noted that other metal hydroxides exhibit similar behavior to iron. Accordingly, we set out to determine if a self sealing film could be formed from a polymer system containing a small amount of a gelling/swelling agent as a simpler method of achieving the results observed with the iron starch system.

Prior documents in this area include U.S. Pat. No. 4,913,517 to Arroyo et al., U.S. Pat. No. 3,890,974 to Kozak, Canadian patent application number 2,005,764 to Bottiglione et al., European patent application number 0 378 940 A1, Kolloid Zeitschrift V-74, pp. 200–205 (1936) and *The Principles of Colloid and Surface Chemistry*, second edition, by P. C. Hiemenz, pp 782–783 (1986).

OBJECTS OF THE INVENTION

Accordingly, it is a general object of the present invention to provide a thin film which readily self seals small apertures in the presence of water vapor or water.

Still further objects and the broad scope of applicability of the present invention will become apparent to those of skill in the art from the details given hereinafter. However, it should be understood that the detailed description of the presently preferred embodiment of the present invention is given only by way of illustration because various changes and modifications well within the spirit and scope of the invention will become apparent to those of skill in the art in view of the following description.

DEFINITIONS

As used herein the term "xerogellant" refers to a material which, when in a substantially dry state, has the ability to spontaneously imbibe at least about twenty (20) times its own weight in aqueous fluid. Importantly, the xerogellant should have the ability to generally retain its original identity after it has imbibed the fluid. For example, a bead, fiber or film formed from a xerogellant will still be recognizable as such after having imbibed the fluid.

As used herein the term "water dispersible polymer" refers to a polymeric material which is capable of forming a dispersion in an aqueous medium at ambient temperature.

As used herein the term "plasticizing agent" refers to an organic compound which, when added to a high polymer, may increase the ease of processing the high polymer or increase the toughness and flexibility of the high polymer after processing. A plasticizing agent may be able to accomplish all of these.

As used herein the term "thin film" refers to a film having an average thickness of less than about 10 mils. For example, the thin film may have an average thickness of less than about 5 mils. More particularly, the thin film may have an average thickness of less than about 1 mil. Average thickness is determined by five (5) random measurements of the film and averaging the results.

As used herein the term "self sealing thin film" or "self sealable thin film" refers to a thin film which, in the presence of water vapor, has ability to seal apertures having an area of less than about 625,000 square microns.

As used herein the term "aperture" refers to holes having an area of less than about 625,000 square microns. For example, an aperture may have an area of from about 10 to about 625,000 square microns. More particularly, an aperture may have an area of from about 100 to about 235,000 square microns. Even more particularly, an aperture may have an area of from about 500 to about 10,000 square microns.

SUMMARY OF THE INVENTION

The present invention is directed toward a film material which, if apertured, has the ability, in the presence of water vapor or water, to self seal the apertures if they have an area of less than about 625,000 square microns. The material includes at least about 75 weight percent of a water dispersible polymer; from about 0.5 to about 5 weight percent of a xerogellant and from about 7.5 to about 20 weight percent of a plasticizing agent.

In some embodiments the self sealing film material may include at least about 81 weight percent of a water dispersible polymer; from about 1 to about 4 weight percent of a xerogellant and from about 10 to about 15 weight percent of a plasticizing agent. For example, the self sealing film material may include at least about 83 weight percent of a water dispersible polymer; from about 2 to about 3 weight percent of a xerogellant and from about 11 to about 14 weight percent of a plasticizing agent. More particularly, the self sealing film material may include at least about 84.5 weight percent of a water dispersible polymer; about 2.5 weight percent of a xerogellant and about 13 weight percent of a plasticizing agent.

In some embodiments the water dispersible polymer may be selected from the group including high molecular weight amorphous polyesters having one or more ionic substituents attached thereto. In other embodiments the water dispersible polymer may be selected from the group including elastomeric emulsions, acrylic polymers, polyoxides, vinyl polymers, cellulose derivatives, starch derivatives, polysaccahrides, proteins and copolymers thereof. In one embodiment the water dispersible polymer is an elastomeric emulsion which includes about 50% latex, about 50% water, less than about 0.01% acrylamide, less than about 1.0% ammonium hydroxide, less than about 0.01% ethyl acrylate, less than about 0.1% formaldehyde and less than about 0.0025% N-methylolacrylamide.

In some embodiments the xerogellant may be selected from the group including sodium carboxymethyl cellulose, derivatives of sodium carboxymethyl cellulose, poly(acrylic acid) salts, (ethylene oxide), acrylonitrile-grafted starch, hydrolyzed polyacrylonitrile, poly(vinyl alcohol-sodium acrylate) and polyisobutylene-co-disodium maleate.

In some embodiments the plasticizing agent may be selected from the group including glycerin, sorbitol, sucrose, ethylene glycol, propylene glycol, diethylene glycol, polyethylene glycol, acid amides, dimethyl acetamide, dimethyl sulfoxide, methyl pyrrolidene and tetramethylene sulfone.

In some embodiments the thin film material is capable of self sealing apertures having an area of less than about 625,000 square microns in the presence of no more than 75 percent relative humidity in less than about 30 seconds. For example, the thin film material may be capable of self sealing apertures having an area of less than about 235,000 square microns in the presence of no more than 50 percent relative humidity in less than about 30 seconds. More particularly, the thin film material may be capable of self sealing apertures having an area of less than about 10,000 square microns in the presence of no more than 50 percent relative humidity in less than about 15 seconds.

DETAILED DESCRIPTION OF THE INVENTION

Figure 1:
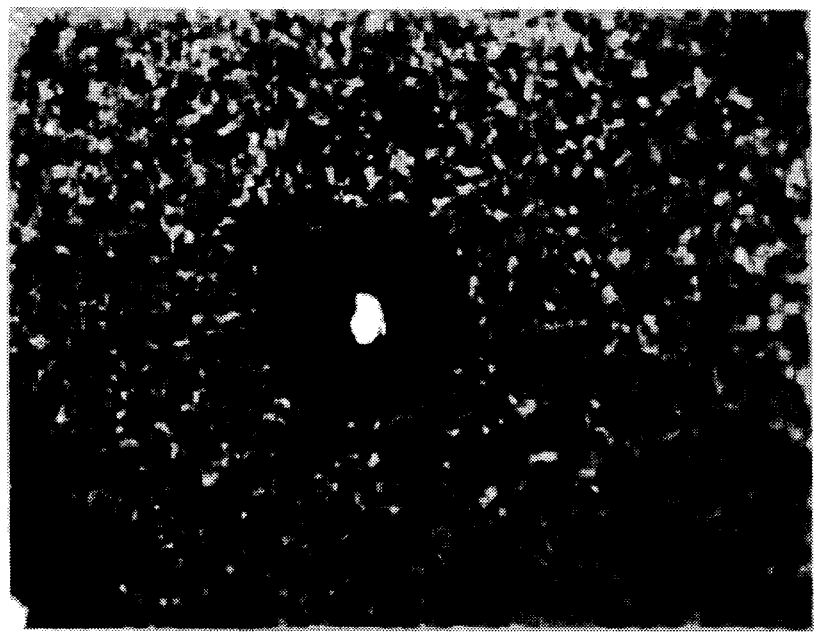
FIG. 1 is a photomicrograph of a sample prepared as described in Example I showing a 250 micron aperture selected for testing as described in Example II.

The self sealing film material of the present invention is formed by placing the xerogellant, preferably in powder form, in an appropriately sized container and adding water so that the xerogellant is fully hydrated. While any material meeting the definition of a xerogellant may be utilized, exemplary xerogellants include sodium carboxymethyl cellulose, poly(acrylic acid) salts, radiation crosslinked poly(ethylene oxide), carboxymethyl cellulose, acrylonitrile-grafted starch, hydrolyzed polyacrylonitrile, poly(vinyl alcohol-sodium acrylate) and polyisobutylene-co-disodium maleate. One xerogellant is a starch grafted sodium polyacrylate which may be obtained from Hoechst Celanese Corporation under the trade designation Sanwet IM5000P.

If the consistency of the xerogellant and water mixture is not that of a fluid, additional water is added until such is the case. This action is only necessary with certain xerogellants. It is to the fluidized xerogellant that the water dispersible polymer and the plasticizing agent are added. The water dispersible polymer may be added to the hydrated xerogellant as an aqueous dispersion.

While any film forming water dispersible polymer may be utilized, exemplary film forming water dispersible polymers include such polymers chosen from the group including high molecular weight amorphous polyesters having one or more ionic substituents attached thereto. This type of polymer is available form the Eastman Chemical Co. of Kingsport, Tenn., under the trade designation Eastman AQ®. In particular, Eastman AQ 55D and AQ 38D. Alternatively the water dispersible polymer may be selected from the group including elastomeric emulsions, acrylic polymers, polyoxides, vinyl polymers, cellulose derivatives, starch derivatives, polysaccahrides, proteins and copolymers thereof. Exemplary elastomeric emulsions may be obtained from the B.F. Goodrich Co., Specialty Polymers & Chemicals Division under the trade designation HyStretch™. HyStretch™ elastomeric emulsions typically are a blend of about 50% latex, about 50% water, less than about 0.01% acrylamide, less than about 1.0% ammonium hydroxide, less than about 0.01% ethyl acrylate, less than about 0.1% formaldehyde and less than about 0.0025% N-methylolacrylamide.

While any suitable plasticizing agent may be utilized, exemplary plasticizing agents include glycerin, sorbitol, sucrose, ethylene glycol, propylene glycol, diethylene glycol, polyethylene glycol, acid amides, dimethyl acetamide, dimethyl sulfoxide, methyl pyrrolidene and tetramethylene sulfone. One exemplary plasticizing agent is glycerin which may be obtained from Fischer Scientific of Fairtown, N.J., under the trade designation G-33-1.

After the three components have been thoroughly mixed, they are cast, in conventional manner, in a film forming mold. Thereafter the water is removed by natural evaporation which, if desired, may be assisted by low grade heating of the cast mixture.

Discounting the water which is evaporated away, the xerogellant, the film forming water dispersible polymer and the plasticizing agent are blended together in a conventional manner so that the final weight percentage of these components, after removal of the water by evaporation, is at least about 81 weight percent of the water dispersible polymer; from about 1 to about 4 weight percent of the xerogellant; and from about 10 to about 15 weight percent of the plasticizing agent. More particularly, the final weight percentages of these components of the material may range from at least about 83 weight percent of the water dispersible polymer; from about 2 to about 3 weight percent of the xerogellant; and from about 11 to about 14 weight percent of the plasticizing agent. Even more particularly, the final weight percentages of these components may range from at least about 84.5 weight percent of the water dispersible polymer; about 2.5 weight percent of the xerogellant; and about 13 weight percent of the plasticizing agent.

Those of skill in the art will readily recognize that the self sealing thin film material may be formed by other methods. For example, the material may be formed by extrusion methods.

The invention will now be described with respect to certain specific embodiments thereof.

EXAMPLE I

About 0.352 grams of Sanwet IM5000P xerogellant was combined with about 300 milliliters of water in a 600 milliliter beaker. The solution was stirred gently and the xerogellant was allowed to hydrate for sixty (60) minutes. The xerogellant swelled and a clear gel formed in the beaker. After 60 minutes, the gel was poured into a Waring blender model no. 7011 and mixed at high speed for about one minute, resulting in a "liquified" solution. This liquified solution was poured back into the 600 milliliter beaker and about 24.26 grams of a 28% solution (6.79 grams of polymer) of water dispersible polymer obtained under the trade designation AQ55D form the Eastman Chemical Co. was added. Also added at this time was 1.068 grams of glycerol, a plasticizing agent, obtained under the trade designation G 33-1 from the Fischer Scientific Corp.

The mixture was stirred by hand gently with a glass stir rod and then stirred mechanically with a magnetic stir bar until thoroughly mixed. Once mixed thoroughly, the solution was poured into two (2) individual wax molds, both measuring 0.5 inches deep, 4.0 inches wide and 8.0 inches long. The molds were machined from blocks of wax by the McKellco Corp. of Alpharetta, Ga. The solutions were dehydrated initially in a micro/convection oven at 180 degrees Fahrenheit for one hour in order to speed up the evaporation process. The molds were then removed from the oven and the films they contained were dried over desiccant for four (4) days until dry. A film having a thickness of about eight (8) mils was obtained.

The dried films were gently removed form each of the wax blocks and cut into small circles (having a diameter of three(3)inches)for testing and evaluation of the film's self sealing capabilities.

EXPERIMENTAL TESTING OF SELF SEALING CAPABILITY

Apertures were made in the three inch diameter film samples by mechanically punching them with 200 needles bundled together in a one (1) inch diameter circle. The needle bundle was placed on top of the film so that the center of the needle bundle was located generally at the center of the sample and the bundle was gently tapped with a hammer until the needles cleanly broke through the film leaving behind about 200 apertures per square inch having diameters of from about 150 to about 250 microns. The diameters of the apertures were measured using conventional photomicrography equipment. One aperture, measured to be about 190 microns was selected and marked for the self sealing experiment.

The apertured sample was then sandwiched between two (2) impervious films each having a one (1) inch diameter circular aperture cut in the center of them. This "sandwich" was then mounted in a water vapor transmission test cup having a diameter of about 2.5 inches and containing about 100 milliliters of water. The cup and its contents were placed in a controlled temperature/humidity oven a 100 degrees Fahrenheit and 50 percent relative humidity.

After 15 minutes, the sample film was removed from the oven and removed from the "sandwich". The 190 micron aperture was now closed.

This example was repeated with a film of essentially pure AQ 55D and the aperture did not close.

EXAMPLE II

Figure 2:
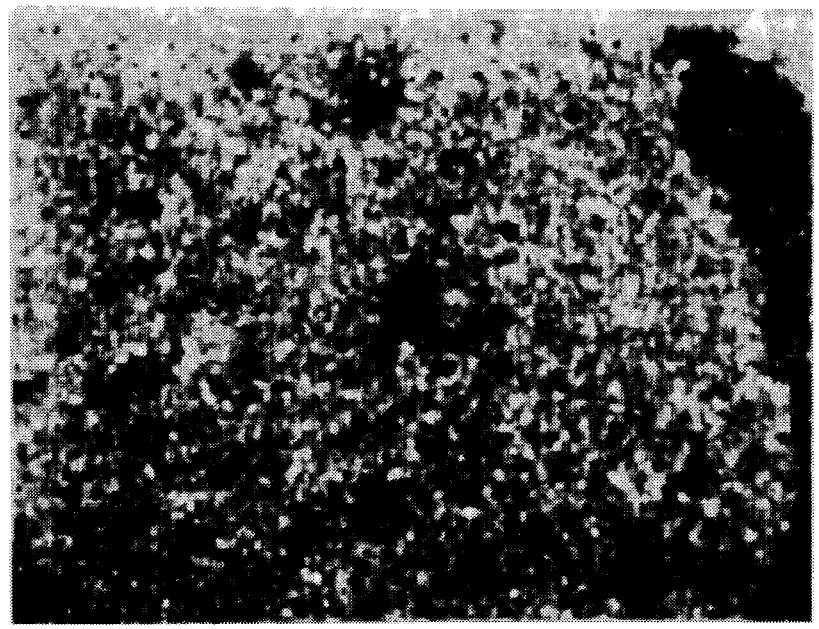
FIG. 2 is a photomicrograph of the same aperture as shown in FIG. 1 after the sample had been subjected to 15 seconds in a steam environment as described in Example II.

Another of the apertured samples prepared as described in Example I, was exposed to 100 percent steam. The steam was provided by boiling water in a pyrex dish on a hot plate. A 250 micron aperture was selected and photomicrographed for this experiment. FIG. 1 is this photomicrograph. After 15 seconds in the steam environment, the aperture had closed as indicated by the "after" photomicrograph, FIG. 2.

EXAMPLE III

In an effort to determine how rapidly the aperture closed or "self sealed", Example II was repeated with the apertured film being removed from the steam environment in five (5) seconds. This is as rapid as this task could be accomplished.

Figure 3:
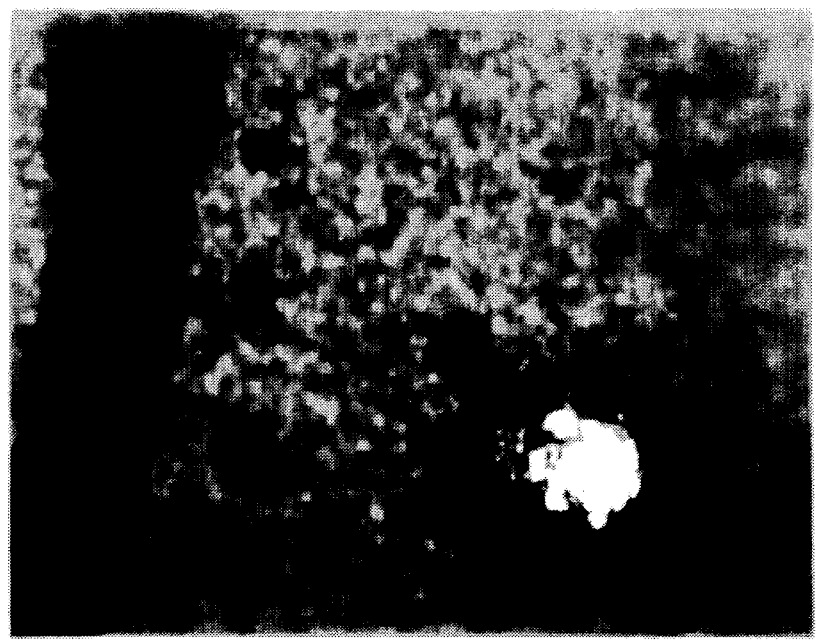
FIG. 3 is a photomicrograph of a sample prepared as described in Example I showing an aperture selected for testing as described in Example III.
Figure 4:
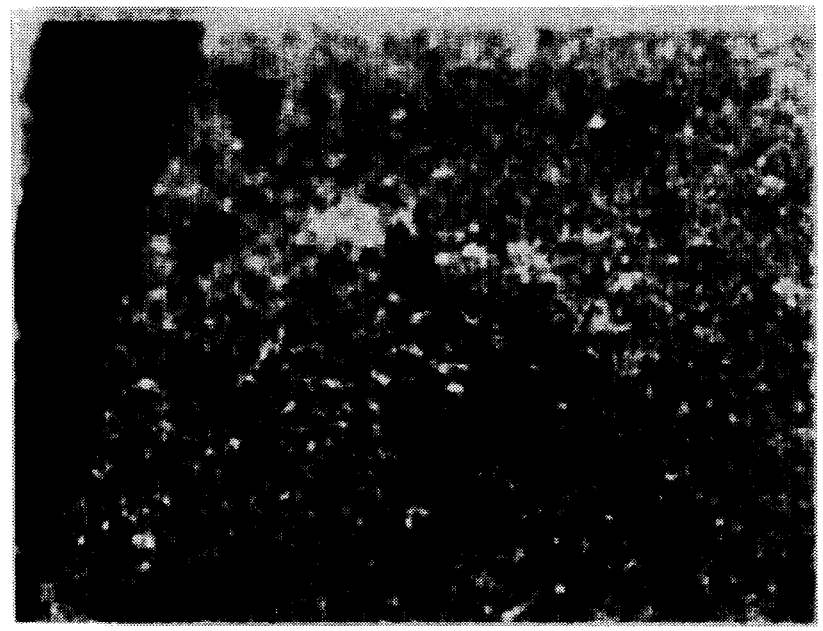
FIG. 4 is a photomicrograph of the same aperture as shown in FIG. 3 after the sample had bee subjected to 5 seconds in a steam environment as described in Example III.

FIG. 3 is the "before" photomicrograph of the aperture of Example III. Upon removing the sample from the steam environment after five (5) seconds, the aperture had closed as indicated by the "after" photomicrograph, FIG. 4.

For comparison purposes, this experiment was repeated with a film of essentially pure AQ 55D and the aperture did not close up.

While the invention has been described in detail with respect to specific preferred embodiments thereof, it will be appreciated that those skilled in the art, upon attaining an understanding of the foregoing, may readily conceive of alterations to and variations of the preferred embodiments. Such alterations and variations are believed to fall within the scope and spirit of the invention and the appended claims.

What is claimed is:

1. A film having an average thickness of less than about 10 mils comprising:
   at least about 83 weight percent of a water dispersible polymer;
   from about 2 to about 3 weight percent of a xerogellant, which, when in a substantially dry state, has the ability to generally retain its physical identity while imbibing at least about twenty times its own weight of an aqueous fluid; and
   from about 11 to about 14 weight percent of a plasticizing agent; and
   whereby the film is adapted to self seal apertures having an area of less than about 625,000 square microns in response to the presence of water vapor.

2. The self sealing film of claim 1, wherein the water dispersible polymer is selected from the group consisting of high molecular weight amorphous polyesters having one or more ionic substituents attached thereto.

3. The self sealing film of claim 1, wherein the water dispersible polymer is selected from the group consisting of elastomeric emulsions, acrylic polymers, vinyl polymers and proteins.

4. The self sealing film of claim 1, wherein the water dispersible polymer is an elastomeric emulsion which comprises about 50% latex, about 50% water, less than about 0.01% acrylamide, less than about 1.0% ammonium hydroxide, less than about 0.01% ethyl acrylate, less than about 0.1% formaldehyde and less than about 0.0025% N-methylolacrylamide.

5. The self sealing film of claim 1, wherein the xerogellant is selected from the group consisting of sodium carboxymethyl cellulose, poly(acrylic acid) salts, poly(ethylene oxide), acrylonitrile-grafted starch, hydrolyzed polyacrylonitrile, poly(vinyl alcohol-sodium acrylate and polyisobutylene-co-disodium maleate.

6. The self sealing film of claim 1, wherein the plasticizing agent is selected from the group consisting of glycerin, sorbitol, sucrose, ethylene glycol, propylene glycol, diethylene glycol, polyethylene glycol, dimethyl acetamide, dimethyl sulfoxide, methyl pyrrolidene and tetramethylene sulfone.

7. The self sealing film of claim 1, wherein the thin film material is capable of self sealing apertures having an area of less than about 625,000 square microns in the presence of no more than 75 percent relative humidity in less than about 30 seconds.

8. The self sealing film of claim 1, wherein the thin film material is capable of self sealing apertures having an area of less than about 235,000 square microns in the presence of no more than 50 percent relative humidity in less than about 30 seconds.

9. The self sealing film of claim 1, wherein the thin film material is capable of self sealing apertures having an area of less than about 10,000 square microns in the presence of no more than 50 percent relative humidity in less than about 15 seconds.

10. The film of claim 1, wherein the water dispersible polymer is a polysaccahride.

11. A film having an average thickness of less than about 10 mils, comprising:

about 84.5 weight percent of a water dispersible polymer;

about 2.5 weight percent of a xerogellant, which, when in a substantially dry state, has the ability to generally retain its physical identity while imbibing at least about twenty times its own weight of an aqueous fluid; and about 13 weight percent of a plasticizing agent; and whereby the film is adapted to self seal apertures having an area of less than about 625,000 square microns in response to the presence of water vapor.

12. The self sealing film of claim 11, wherein the water dispersible polymer is an elastomeric emulsion which comprises about 50% latex, about 50% water, less than about 0.01% acrylamide, less than about 1.0% ammonium hydroxide, less than about 0.01% ethyl acrylate, less than about 0.1% formaldehyde and less than about 0.0025% N-methylolacrylamide.

13. A film having an average thickness of less than about 10 mils comprising:

at least about 83 weight percent of a water dispersible polymer which is an elastomeric emulsion which comprises about 50% latex, about 50% water, less than about 0.01% acrylamide, less than about 1.0% ammonium hydroxide, less than about 0.01% ethyl acrylate, less than about 0.1% formaldehyde and less than about 0.0025% N-methylolacrylamide;

from about 2 to about 3 weight percent of a xerogellant, which, when in a substantially dry state, has the ability to generally retain its physical identity while imbibing at least about twenty times its own weight of an aqueous fluid, said xerogellant being selected from the group consisting of sodium carboxymethyl cellulose, poly(acrylic acid) salts, poly(ethylene oxide), acrylonitrile-grafted starch, hydrolyzed polyacrylonitrile, poly(vinyl alcohol-sodium acrylate), polyisobutylene-co-disodium maleate; and from about 11 to about 14 weight percent of a plasticizing agent selected from the group consisting of glycerin, sorbitol, sucrose, ethylene glycol, propylene glycol, diethylene glycol, polyethylene glycol, dimethyl acetamide, dimethyl sulfoxide, methyl pyrrolidene and tetramethylene sulfone; and whereby the film is adapted to self seal apertures having an area of less than about 625,000 square microns in the presence of no more than 75 percent relative humidity in less than about 30 seconds.

14. The self sealing film of claim 13, wherein the film is adapted to self seal apertures having an area of less than about 235,000 square microns in the presence of no more than 50 percent relative humidity in less than about 30 seconds.

15. The self sealing film of claim 13, wherein the film is adapted to self seal apertures having an area of less than about 10,000 square microns in the presence of no more than 50 percent relative humidity in less than about 15 seconds.

16. A film having an average thickness of less than about 10 mils comprising:

at least about 83 weight percent of a water dispersible polymer selected from the group consisting of high molecular weight amorphous polyesters having one or more ionic substituents attached thereto;

from about 2 to about 3 weight percent of a xerogellant, which, when in a substantially dry state, has the ability to generally retain its physical identity while imbibing at least about twenty times its own weight of an aqueous fluid, said xerogellant being selected from the group consisting of sodium carboxymethyl cellulose, poly(acrylic acid) salts, poly(ethylene oxide), acrylonitrile-grafted starch, hydrolyzed polyacrylonitrile, poly(vinyl alcohol-sodium acrylate), polyisobutylene-co-disodium maleate; and from about 11 to about 14 weight percent of a plasticizing agent selected from the group consisting of glycerin, sorbitol, sucrose, ethylene glycol, propylene glycol, diethylene glycol, polyethylene glycol, dimethyl acetamide, dimethyl sulfoxide, methyl pyrrolidene and tetramethylene sulfone; and whereby the film is adapted to self seal apertures having an area of less than about 625,000 square microns in the presence of no more than 75 percent relative humidity in less than about 30 seconds.

* * * * *